United States Patent
Chang

(10) Patent No.: US 7,519,376 B2
(45) Date of Patent: Apr. 14, 2009

(54) NAVIGATING METHOD FOR CELL PHONE WITH POSITIONING DEVICE AND APPARATUS THEREOF

(75) Inventor: Jien-Yang Chang, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 0 days.

(21) Appl. No.: 11/890,501

(22) Filed: Aug. 7, 2007

(65) Prior Publication Data

US 2007/0279282 A1    Dec. 6, 2007

Related U.S. Application Data

(63) Continuation-in-part of application No. 11/341,478, filed on Jan. 30, 2006, now abandoned.

(30) Foreign Application Priority Data

Jan. 31, 2005    (TW) ................. 94102945 A

(51) Int. Cl.
*G01S 5/14* (2006.01)
(52) U.S. Cl. .............. 455/456.3; 342/357.07; 342/357.08; 342/357.1
(58) Field of Classification Search .......... 342/357.07, 342/357.08, 357.09, 357.1; 455/456.1, 456.3
See application file for complete search history.

(56) References Cited

U.S. PATENT DOCUMENTS

| 6,430,498 | B1 * | 8/2002 | Maruyama et al. ....... 342/357.8 |
| 6,504,503 | B1 * | 1/2003 | Saint-Hilaire et al. .. 342/357.08 |
| 6,553,236 | B1 | 4/2003 | Dunko et al. |
| 6,993,325 | B1 | 1/2006 | Waesterlid et al. |
| 7,020,556 | B2 * | 3/2006 | Kim ...................... 342/357.09 |
| 2002/0038182 | A1 | 3/2002 | Wong et al. |
| 2002/0119789 | A1 * | 8/2002 | Friedman .................... 455/456 |
| 2002/0137526 | A1 * | 9/2002 | Shinohara ................... 455/456 |
| 2002/0145561 | A1 * | 10/2002 | Sandhu et al. ......... 342/357.09 |
| 2003/0167306 | A1 * | 9/2003 | Kaplan ..................... 709/205 |
| 2005/0009540 | A1 * | 1/2005 | Lee et al. ................ 455/456.6 |
| 2006/0025158 | A1 | 2/2006 | Leblanc et al. |
| 2006/0052112 | A1 | 3/2006 | Baussi et al. |
| 2006/0073838 | A1 | 4/2006 | Kamali et al. |
| 2006/0223518 | A1 * | 10/2006 | Haney ........................ 455/420 |
| 2007/0001901 | A1 * | 1/2007 | Yeh et al. ............... 342/357.09 |
| 2007/0016361 | A1 * | 1/2007 | Lee et al. ..................... 701/200 |
| 2007/0067398 | A1 * | 3/2007 | Karmarkar .................. 709/206 |
| 2008/0132251 | A1 * | 6/2008 | Altman et al. .............. 455/457 |
| 2008/0132252 | A1 * | 6/2008 | Altman et al. .............. 455/457 |

OTHER PUBLICATIONS

Field, Merriam-Webster Online, http://www.merriam-webster.com/dictionary/field, retrieved Apr. 9, 2008.*

(Continued)

Primary Examiner—Thomas H Tarcza
Assistant Examiner—Fred H Mull
(74) Attorney, Agent, or Firm—Rabin & Berdo, P.C.

(57) ABSTRACT

A navigating method for a cell phone with a positioning device and the apparatus thereof are described. The longitudinal and latitudinal coordinates of a guiding mobile in a global positioning system (GPS) are sent to a guided mobile via a short message service (SMS). After decoding the short message contents, the longitudinal and latitudinal coordinates are obtained by the guided mobile. And a navigation application is wakened and launched to perform a navigation function by establishing the longitudinal and latitudinal coordinates as a navigation destination.

26 Claims, 8 Drawing Sheets

| header field | state field | name field | phone number | coordinate field | checksum field |

OTHER PUBLICATIONS

Encode, The American Heritage Dictionary of the English Language: Fourth Edition, 2000.

Benefon ESC! Personal Navigation Phone, GSM+GPS, Product Data, http://www.benefon.com/products/esc/product_data.htm, 3 pages, Aug. 8, 2002.

Benefon TWIG Discovery Quick Guide, 2000.

C.A. Gogate et al., Monitoring and transmission of heavy vehicle parameters using fixed cellular terminal, IEEE 60th Vehicular Technology Conference, vol. 6, p. 4100-4102, Sep. 2004.

N.K. Papadoglou et al., Providing location information from GPS through the GSM-short message service for the use of an AVL system, 1st International Symposium on Communications Systems and Digital Signal Processing, abstract, Apr. 1998.

S. Collesei et al. Short message service based applications in the GSM network, IEEE International Symposium on Personal, Indoor and Mobile Radio Communications, vol. 3, p. 939-943, Sep. 1994.

* cited by examiner

| header field | state field | name field | phone number | checksum field |
|---|---|---|---|---|

FIG. 4A (PRIOR ART)

| header field | state field | name field | phone number | coordinate field | checksum field |
|---|---|---|---|---|---|

FIG. 4B

NAVIGATING METHOD FOR CELL PHONE WITH POSITIONING DEVICE AND APPARATUS THEREOF

CROSS-REFERENCE TO RELATED APPLICATIONS

This application is a continuation-in-part patent application of U.S. application Ser. No. 11/341,478 filed on Jan. 30, 2006, which claimed priority from Taiwanese application No. 094102945, filed Jan. 31, 2005.

BACKGROUND OF THE INVENTION

1. Field of Invention

The invention relates to a navigating method for a cell phone with a positioning device and the apparatus thereof. In particular, the invention utilizes the SMS (Short Message Service) to transmit the position coordinates from a GPS.

2. Related Art

With rapid development in the cell phone technology, a new function is added to cell phones every now and then. It has evolved from old black-and-white phones to the current color phones, from monotonic bells to the current musics, the packet transmission for wireless application protocol (WAP) web surfing and general packet radio services (GPRS). The cell phone can even record videos just like the digital video (DV). In spite of its many functions, the most basic two functions of the cell phones have been existent all the time: conversation and transmitting short messages.

According to statistics, the popularity of cell phones in Taiwan has topped the world. Therefore, the cell phone has become an indispensable tool. Each person has at least one cell phone on the average. A valuable function in the cell phone is to allow the user to find out its position from the closest three base stations by trigonometry. Moreover, geographical information such as food, banks, movie theaters, etc can be transmitted to the user. Sometimes, the base station covers a range of as wide as several kilometers. The error can be as large as hundreds of meters. This does not provide the required precision.

Due to recent progress in IC designs and chip productions, manufacturers have developed a global positioning system (GPS) with a small-size chip. Imbedding such a chip in a cell phone enables the cell phone to enjoy the GPS functions. The consumers do not need to spend several hundreds of dollars to carry an additional GPS receiver.

SUMMARY OF THE INVENTION

In view of the foregoing, an object of the invention is providing a navigating method for a cell phone with a GPS and the system thereof. The longitudinal and latitudinal coordinates in the global positioning system (GPS) positioned by a guiding mobile are sent to a smart phone thereof via the short message service (SMS). After decoding the short message contents, the longitudinal and latitudinal coordinates are applied to a geographic information system (GIS) to navigate the position of the other party.

To achieve the above object, the disclosed navigating apparatus for the cell phone with a positioning device includes a guiding mobile and a guided mobile. The mobile includes a GPS receiving module, a global system for mobile (GSM) communications module, an input module, a central processing unit (CPU), a display module, and a memory module.

The GPS receiving module receives the position coordinate signals transmitted from the satellites. The GSM communication module sends out the longitudinal and latitudinal coordinates encoded in the SMS. The input module receives settings given by the user. The CPU converts the position coordinate signals into longitudinal and latitudinal coordinates, encodes them into a positioning short message by the guiding mobile, and decodes the coordinates contained in the positioning short message by the guided mobile from the coordinate field of the short message. When obtaining the longitudinal and latitudinal coordinates, a navigation application is automatically wakened and launched to perform a navigation function by establishing the longitudinal and latitudinal coordinates as a navigation destination. Also, the navigation application displays a location point on a map of the navigation application by the display module according to the longitudinal and latitudinal coordinates.

Besides, the disclosed navigating method for the cell phone with a positioning device includes the following steps. When receiving a short message containing a longitudinal and latitudinal coordinates encoded therein, the guided mobile decodes the short message to obtain the longitudinal and latitudinal coordinates. The navigation application is wakened and launched when recognizing the longitudinal and latitudinal coordinates. Then a navigation function is performed by establishing the longitudinal and latitudinal coordinates as a navigation destination. Moreover, the navigation application also can display a location point on a map of the navigation application according to the longitudinal and latitudinal coordinates.

BRIEF DESCRIPTION OF THE DRAWINGS

The invention will become more fully understood from the detailed description given hereinbelow illustration only, and thus are not limitative of the present invention, and wherein:

FIG. 4A shows the format of a conventional short message;

FIG. 4B shows the format of a short message according to the invention;

DETAILED DESCRIPTION OF THE INVENTION

Figure 1:
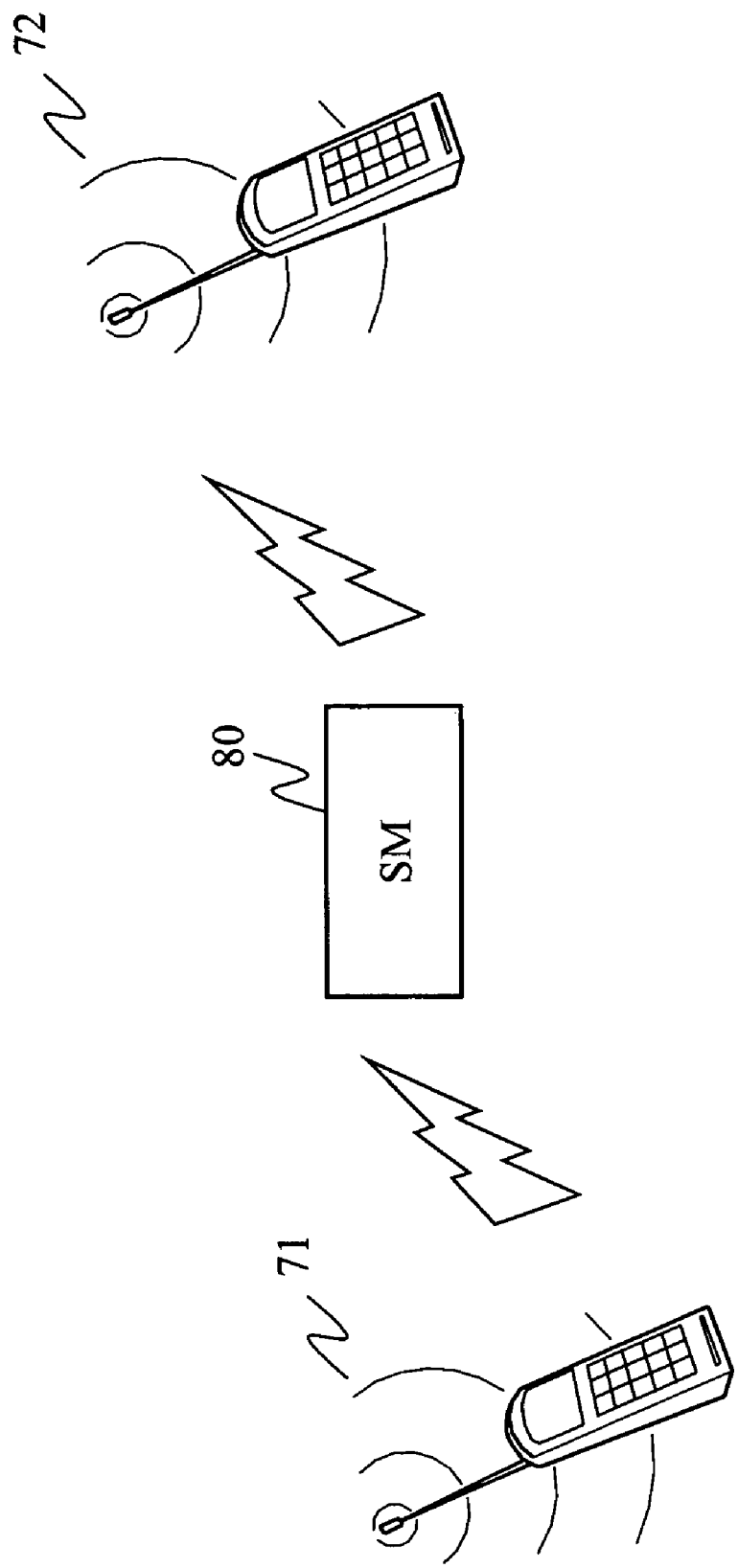
FIG. 1 shows the apparatus of the invention.

The navigating apparatus for cell phone system with a positioning device, referring to FIG. 1, includes a guiding mobile 71 and a guided mobile 72. The guiding mobile 71 can navigate the guided mobile 72 via providing a short message (SM) 80 to the guided mobile 72 and via a navigation application 270 of the guided mobile 72, also shown in FIG. 3.

Figure 2:
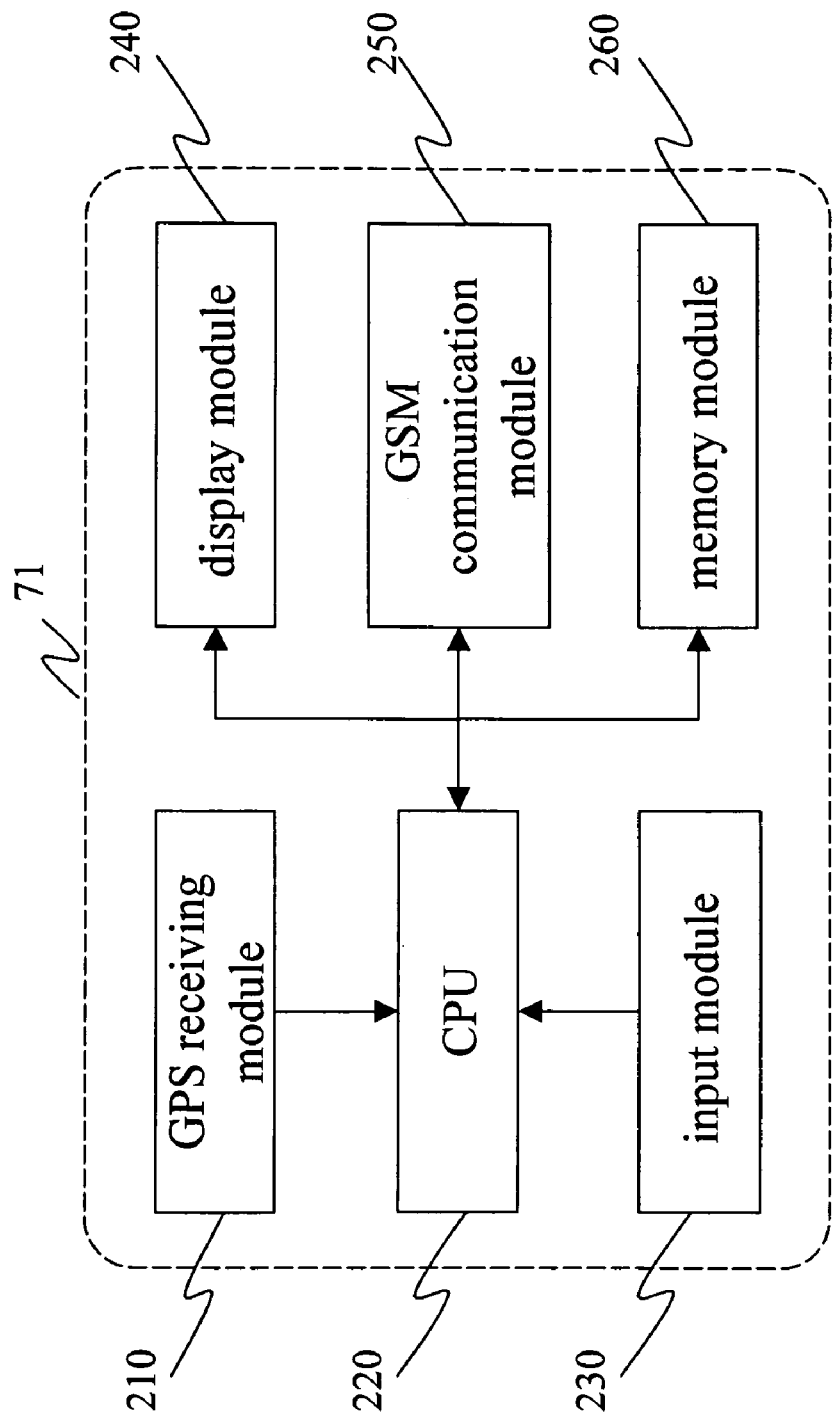
FIG. 2 shows the structure of the guiding mobile according to the invention.

Please refer to FIG. 2, the guiding mobile 71 contains the following modules: (A) a GPS receiving module 210; (B) a CPU 220; (C) an input module 230; (D) a display module 240; (E) a GSM communication module 250; and (F) a memory module 260.

The GPS receiving module 210 receives position coordinate signals transmitted from satellite 110. The CPU 220 converts the position coordinate signals into longitudinal and latitudinal coordinates, and encodes the longitudinal and latitudinal coordinates and some information (e.g. title, phone number, name, etc) into a positioning short message. Here, some information (e.g. title, phone number, name, etc)

encoded into the positioning short message is encoded according to a specific format of the positioning short message.

The input module 230 generally refers to a keyboard or a touch-control pad used to receive the settings and inputs from the user. The input command is sent to the CPU 220 for processing. The input module 230 further includes a position transmitting key. After the user presses this key, a short message containing the longitudinal and latitudinal coordinates of the current position are produced. The display module 240 refers to the liquid crystal display (LCD) for display text information on a normal cell phone.

The GSM communication module 250 sends out the encoded position coordinate message via the SMS. It contains an RF device, a controller, and digital signal processor. The memory module 260 stores a phone book and the record of short message transmissions.

Figure 3:
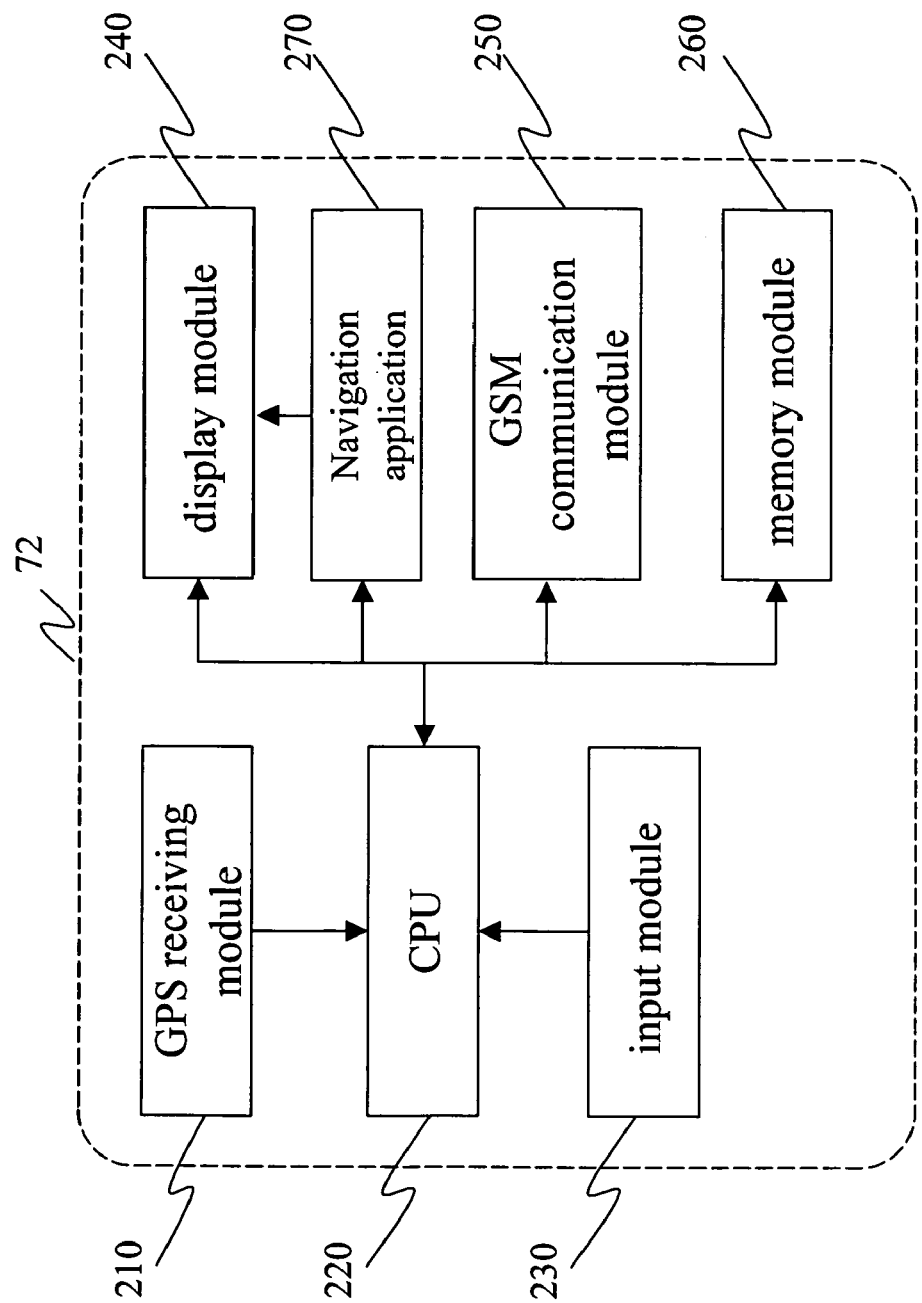
FIG. 3 shows the structure of the guided mobile according to the invention.

Please refer to FIG. 3; the guided mobile 72 further includes a navigation application 270. When receiving the short message 80, the user of the guided mobile 72 can click (or rightclick) the short message to directly waken and launch the navigation application 270. Then, a navigation function is performed by establishing the longitudinal and latitudinal coordinates as a navigation destination. Moreover, the navigation application 270 also can display a location point on a map of the navigation application 270 according to the longitudinal and latitudinal coordinates. The guiding mobile 71 may also have a navigation application, not shown in the FIGS., or the guiding mobile 71 and the guided mobile 72 have the same structure.

For illustration purposes, the drawing only shows those devices that are relevant to the invention. Other modules commonly used in regular cell phones, such as the subscriber identify module (SIM) and power supply module, are not explicitly shown.

Referring to FIG. 4B, the short message 80 contains the following fields:

A header field. This field is filled with a code of a series of special characters to indicate that the short message is in a special format. Once the CPU 220 reads this series of special characters, it immediately knows that this is a tracking short message and decodes it to extract the corresponding information;

A state field. This field is filled with a code to represent a corresponding situation. For example, 01 represents "I am lost", 02 represents "Emergency at home", and so on;

A name field. This field is used to record the name of the user, stored in advance by the user in the memory module 260 to represent the cell phone;

A phone number field. This field is used to record the phone number of the user; and A checksum field. It is used to prevent from receiving erroneous short messages during the transmission process. The checksum can be a Hamming code or a cyclic redundancy check (CRC) code.

A coordinate field. It records the longitudinal and latitudinal coordinates.

FIG. 4A shows a conventional structure of a short message. As is well known in the art, a portion of the short message, identified herein as the state field, contains the actual text message data, while all other fields constitute the non-text message portion of the short message, which contains, for example, the header or checksum of the message. (The text message may be an encoded text message.) In contrast, the short message 80 in FIG. 4B further comprises a coordinate field in the non-text message portion of the short message, independent of the state field, to record the longitudinal and latitudinal coordinates. Hence, the CPU 220 of the guided mobile 72 can easily obtain the longitudinal and latitudinal coordinates from recognizing the coordinate field of the short message.

Therefore, the guiding mobile 71 receives at least one position coordinate signals of the guiding mobile's current position from a plurality of satellites. The central processing unit (CPU) 220 of the guiding mobile 71 converts the position coordinate signals into the longitudinal and latitudinal coordinates, and encodes a short message 80 containing the longitudinal and latitudinal coordinates encoded therein. The GSM communications module 250 of the guiding mobile 71 transmits the short message 80 to a guided mobile 72. When the guided mobile 72 receives the short message 80 from its communications module 250, the central processing unit (CPU) 220 of the guided mobile 72 decodes the short message 80, recognizes the coordinate field of the short message 80, to obtain the longitudinal and latitudinal coordinates. Then, the navigation application 270 is wakened and launched to performing a navigation function by establishing the longitudinal and latitudinal coordinates as a navigation destination. Also, the navigation application 270 displays a location point on a map of the navigation application 270 by a display module 240 according to the longitudinal and latitudinal coordinates. Moreover, the guided mobile 72 would store the longitudinal and latitudinal coordinates as a favorite location in a memory module 260.

Figure 5:
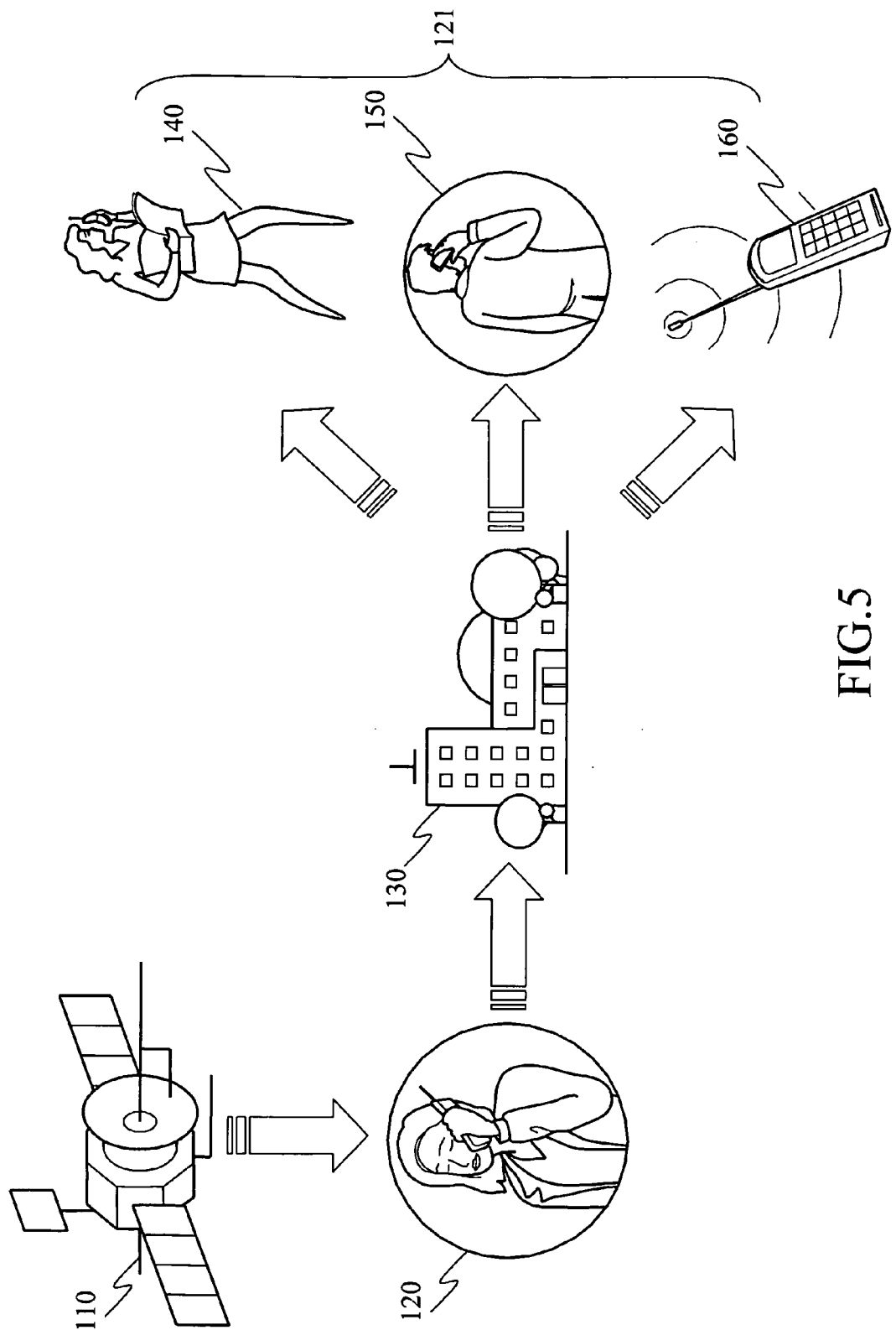
FIG. 5 shows an embodiment of the invention.
Figure 6:
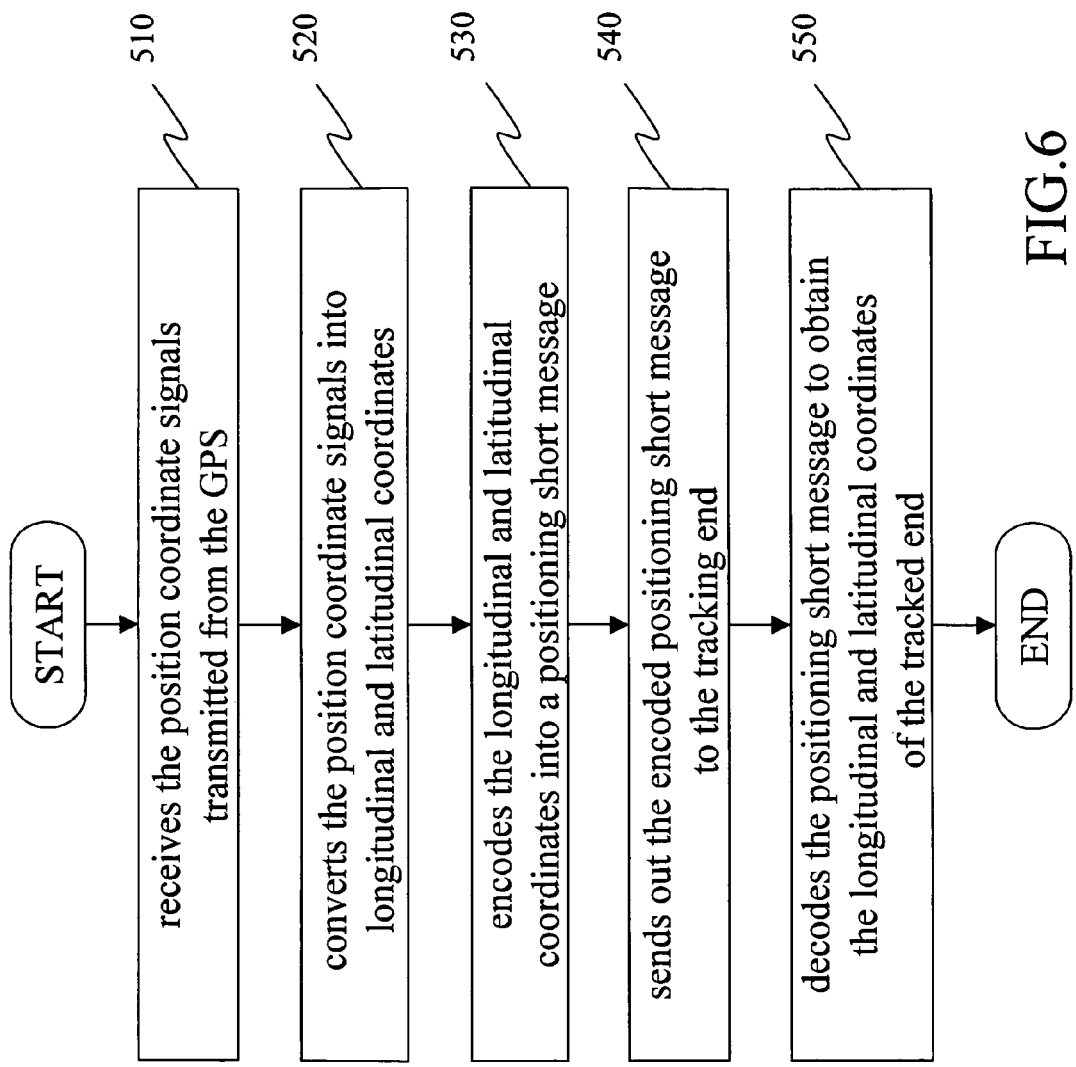
FIG. 6 is a flowchart of the disclosed method.

On the other hand, the structure and method can also be applied in an emergency or tracking situation, shown in FIG. 5. When a tracked end 120 (guiding mobile 71) or a personal calling for help is lost or has an accident, a tracking request can be made to the tracking end 121 (guided mobile 72). The satellite 110 receives the positioning signal of the current position from the satellite. It sends out the positioning short message via the GSM communication module 250. The positioning short message is transferred to the cell phone of the tracking end 121 via an Internet service provider (ISP) 130. The tracking end 121 can use the position of the tracked end 120 encoded in the received positioning short message 80 to find out the corresponding position 140 on the map according to the longitudinal and latitudinal coordinates. If the cell phone is connected to a computer 150 and the computer is installed with a tracking program, then the cell phone can transmit the received positioning short message to the computer to mark down the current position of the tracked end 120 on a tracking map. Alternatively, the tracking end 121 is a smart phone 160, which is built in with a GPS. In that case, in addition to positioning the tracking end 121, the smart phone can mark the position of the tracked end 120 in a GIS accordingly to the received positioning short message Please refer to FIG. 6, after the tracking end 120 receives this short message, firstly it checks the number of the source cell phone, and determines whether the tracking is allowed. If it is not a trackable cell phone number, the short message is deleted directly. If it is set as a trackable cell phone number, then the GPS receiving module 210 receives the position coordinate signals transmitted from the GPS (step 510). The CPU 220 converts the position coordinate signals into longitudinal and latitudinal coordinates (step 520).

The CPU 220 encodes the longitudinal and latitudinal coordinates into a positioning short message (step 530). FIG. 4B shows the format of a positioning short message. The difference between it and the tracking short message is the additional location field, which is used to record the longitudinal and latitudinal coordinates of the current position of the tracking end 120.

The encoded positioning short message is sent out via the GSM communication module 250 (step 540). Finally, the tracking end obtains the positioning short message from its GPS communication module 250. The CPU 220 decodes to obtain the longitudinal and latitudinal coordinates of the tracked end 120 (step 550). The goal of the disclosed tracking method is therefore achieved.

Figure 7:
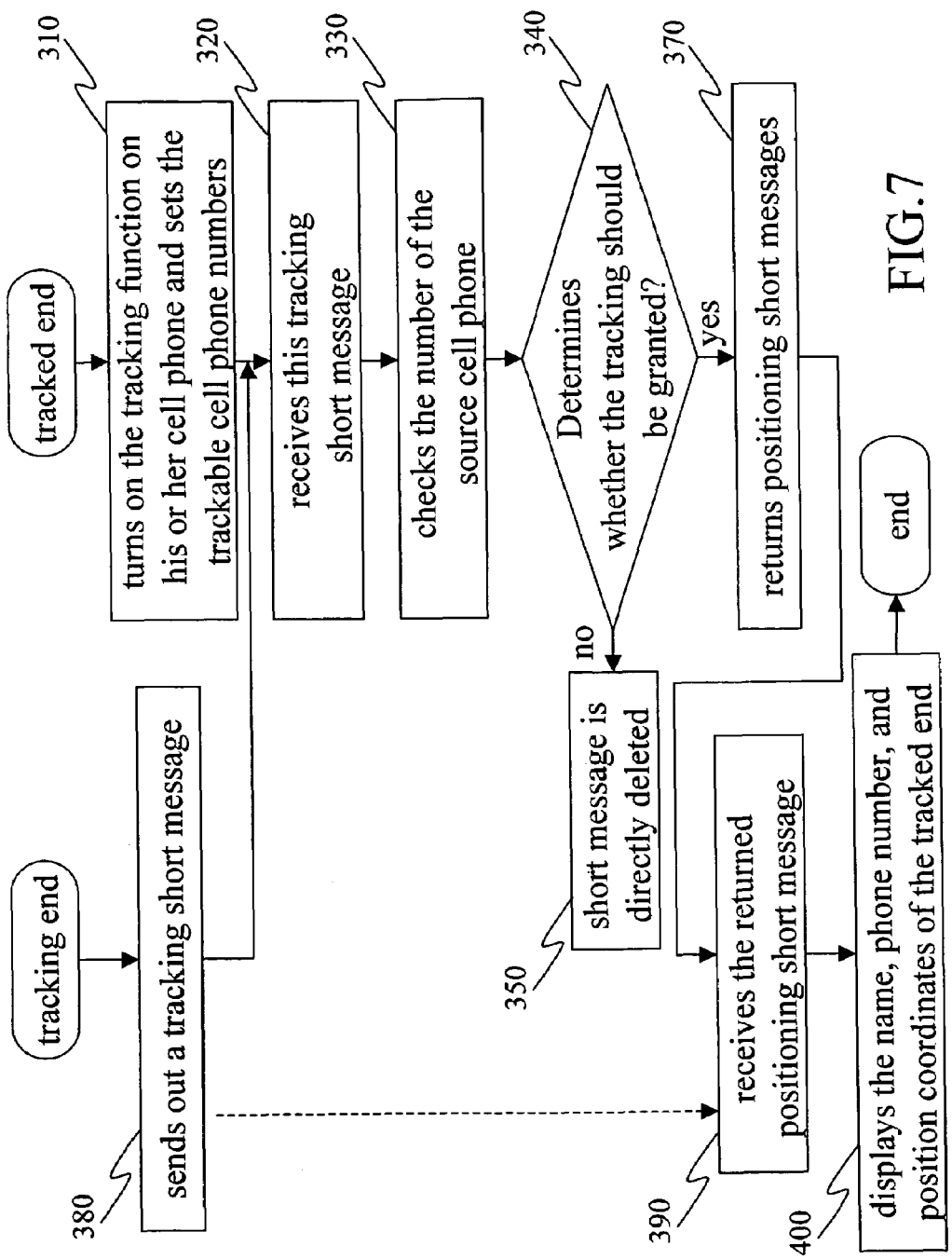
FIG. 7 is a flowchart of the method for tracking.

FIG. 7 shows the flowchart of the disclosed tracking method. First, the tracked end 120 has to turn on the tracking function on his or her cell phone and sets a trackable cell phone number (step 310) in the memory module 260. If the tracking end sends out a tracking short message 80 (step 380), the tracked end 120 receives this tracking short message 80 (step 320) and checks the number of the source cell phone (step 330). The number is compared with the trackable cell phone number set in the memory module 260 to determine whether the tracking should be granted (step 340). If it is not a trackable cell phone number, the short message is directly deleted (step 350). If it is a trackable cell phone number, then a positioning short message is returned (step 370).

When the tracking end receives the returned positioning short message 80 (step 390), the CPU 220 decodes the positioning short message to obtain the name, phone number, and position coordinates of the tracked end 120 (step 400) and displays them on the display module 240. If the cell phone of the tracking end 121 is connected to a computer 150 or it is a smart phone 160 installed with a GIS, then the position of the tracked end 120 can be immediately displayed on a map.

Figure 8:
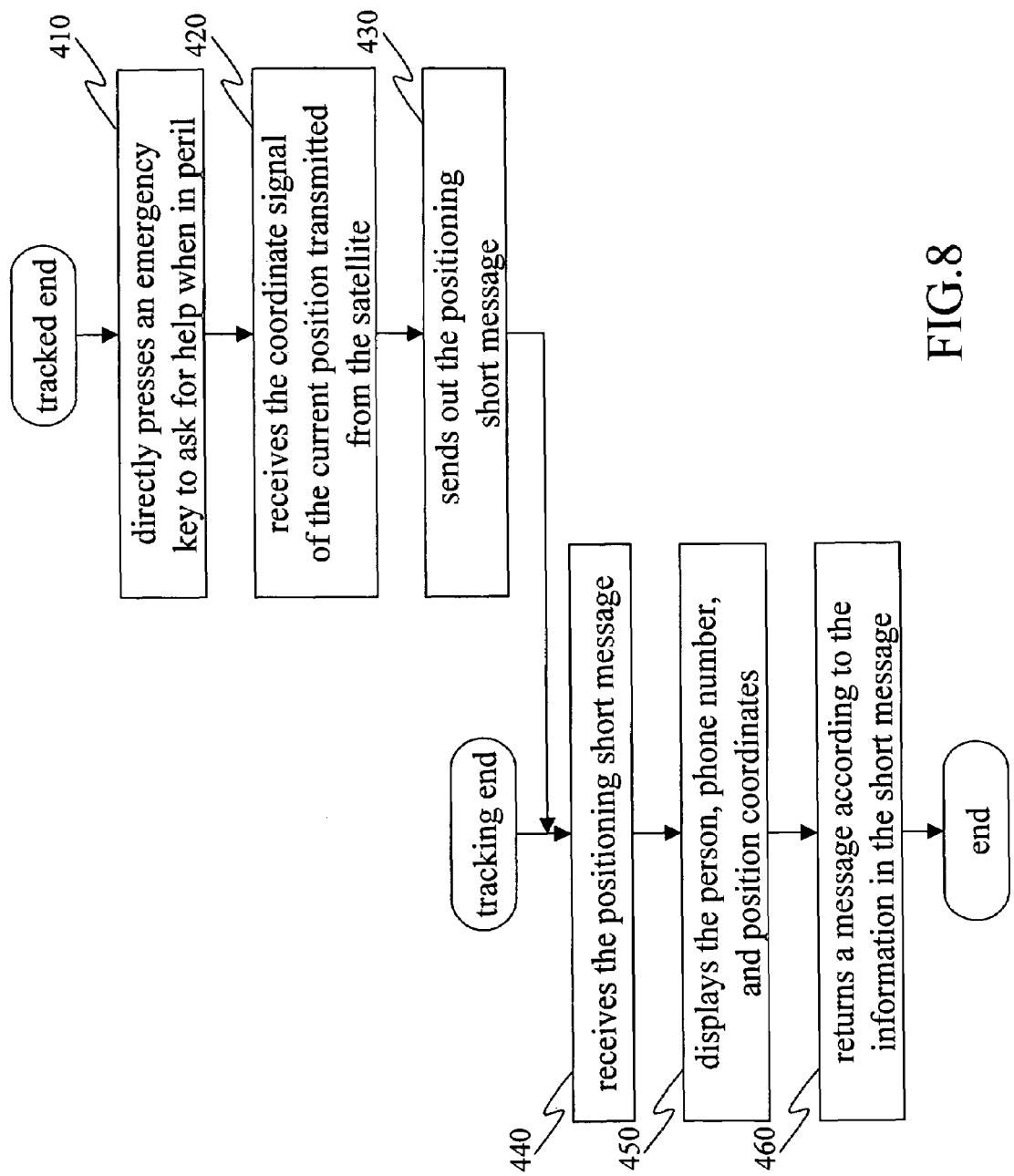
FIG. 8 is a flowchart of the method of positioning.

Aside from letting the tracking end 121 obtain the position coordinates of the tracked end 120, the user can directly press an emergency key to ask for help when in peril. This is illustrated in FIG. 8. When a person encounters an emergency situation, he or she can immediately press the emergency key (step 410).

At this moment, the GPS positioning module 210 immediately receives the coordinate signal of the current position transmitted from the satellite 110 (step 420). The CPU 220 converts the position coordinate signals into longitudinal and latitudinal coordinates, and compiles the longitudinal and latitudinal coordinates into a positioning short message 80 containing an emergency code in the state field. The positioning short message is sent out according to the predetermined cell phone number stored in the memory module 260 (step 430). After receiving the positioning short message 80 (step 440), the CPU 220 immediately decodes it and displays the person, phone number, and position coordinates of the tracked end 120 on the display screen (step 450). If the cell phone of the short message receiver is a smart phone with a GIS or is connected to a computer, then the position of the tracked end 120 is displayed on a map. The GIS further plans a shortest path according to the tracked end 120 and the helper, so that the helper can arrive in the shortest possible time. It also automatically returns a message according to the information in the short message (step 460). This return message ensures that it is not an erroneous call and allows the help to know what is happening.

The reason the invention utilizes the SMS is because it is a function that every cell phone has. Not only it is convenient, the contents of a short message are sufficient to cover the name, longitudinal and latitudinal coordinates, and phone number of the user. Therefore, one may use the short message 80 to readily extract the position of the guiding mobile 71.

Certain variations would be apparent to those skilled in the art, which variations are considered within the spirit and scope of the claimed invention.

What is claimed is:

1. A navigating method for a cell phone with a positioning device, comprising:
    receiving a short message using a communication module, metadata of the short message containing a coordinate field that records longitudinal and latitudinal coordinates;
    accessing the coordinate field to obtain the longitudinal and latitudinal coordinates;
    wakening and launching a navigation application linked to the communication module through the received short message;
    establishing the longitudinal and latitudinal coordinates obtained from the coordinate field as a navigation destination; and
    performing a navigation function of the navigation application using the navigation destination.

2. The navigating method of claim 1, wherein the short message is a message generated by receiving a position coordinate signal transmitted from a GPS, converting the position coordinate signal into the longitudinal and latitudinal coordinates, and encoding the longitudinal and latitudinal coordinates into the coordinate field of the short message.

3. The navigating method of claim 2, wherein the short message is generated by a tracked end and received by a tracking end to navigate the tracking end to the tracked end.

4. The navigating method of claim 1, wherein the short message consists of (a) data of a text message, encoded in a state field, and (b) the metadata external to the text message, which includes the coordinate field and:
    a header field, filled with a code to indicate a format of the short message;
    a name field, filled with a name representing a user who sends the short message;
    a phone number field, recording the phone number of the user; and
    a checksum field, filled with a checksum code to detect a transmission error of the short message.

5. The navigating method of claim 1, wherein the wakening and launching are triggered by clicking the short message.

6. The navigating method of claim 1, wherein the coordinate field only records the longitudinal and latitudinal coordinates.

7. A navigating method for a cell phone with a positioning device, comprising:
    receiving a short message using a communication module, metadata of the short message containing a coordinate field that records longitudinal and latitudinal coordinates;
    accessing the coordinate field to obtain the longitudinal and latitudinal coordinates;
    wakening and launching a navigation application linked to the communication module through the received short message; and
    displaying a location point corresponding to the longitudinal and latitudinal coordinates obtained from the coordinate field on a map of the navigation application.

8. The navigating method of claim 7, wherein the short message is a message generated by receiving a position coordinate signal transmitted from a GPS, converting the position coordinate signal into the longitudinal and latitudinal coordinates, and encoding the longitudinal and latitudinal coordinates into the coordinate field of the short message.

9. The navigating method of claim 8, wherein the short message is generated by a tracked end and received by a tracking end to navigate the tracking end to the tracked end.

10. The navigating method of claim 7, wherein the short message consists of (a) data of a text message, encoded in a state field, and (b) the metadata external to the text message, which includes the coordinate field and:
- a header field, filled with a code to indicate a format of the short message;
- a name field, filled with a name representing a user who sends the short message;
- a phone number field, recording the phone number of the user; and
- a checksum field, filled with a checksum code to detect a transmission error of the short message.

11. The navigating method of claim 7, wherein the wakening and launching are triggered by clicking the short message.

12. The navigating method of claim 7, wherein the coordinate field only records the longitudinal and latitudinal coordinates.

13. A navigating apparatus for cell phone system with a positioning device, comprising:
- a guiding mobile, which includes:
  - a GPS receiving module for receiving at least one position coordinate signals, transmitted from a plurality of satellites, of the guiding mobile's current position;
  - a central processing unit (CPU), for converting the position coordinate signals into longitudinal and latitudinal coordinates, and encoding a short message metadata of the short message including a coordinate field that records the longitudinal and latitudinal coordinates; and
  - a communications module, for transmitting the short message; and
- a guided mobile, which includes:
  - a communications module for receiving the short message;
  - a central processing unit (CPU) for accessing the short message to obtain the longitudinal and latitudinal coordinates from the coordinate field; and
  - a navigation application for establishing the longitudinal and latitudinal coordinates obtained from the coordinate field as a navigation destination for the guided mobile when being wakened and launched through the received short message.

14. The navigating apparatus of claim 13, wherein the short message consists of (a) data of a text message, encoded in a state field, and (b) the metadata external to the text message, which includes the coordinate field and:
- a header field, filled with a code to indicate a format of the short message;
- a name field, filled with a name representing a user who sends the short message;
- a phone number field, recording the phone number of the user; and
- a checksum field, filled with a checksum code to detect a transmission error of the short message.

15. The navigating apparatus of claim 14, wherein the guided mobile further includes a memory module to store the longitudinal and latitudinal coordinates as a favorite location.

16. The navigating apparatus of claim 14, wherein the guided mobile further includes a display module to display a location point according to the longitudinal and latitudinal coordinates.

17. The navigating apparatus of claim 13, wherein the navigation application of the guided mobile is wakened and launched by clicking the short message.

18. The navigating apparatus of claim 13, wherein the guiding mobile, responsive to a tracking short message from the guided mobile, transmits the short message containing the longitudinal and latitudinal coordinates.

19. The navigating apparatus of claim 13, wherein the coordinate field only records the longitudinal and latitudinal coordinates.

20. A navigating apparatus for cell phone system with a positioning device, comprising:
- a guiding mobile, which includes:
  - a GPS receiving module for receiving at least one position coordinate signals, transmitted from a plurality of satellites, of the guiding mobile's current position;
  - a central processing unit (CPU) for converting the position coordinate signals into longitudinal and latitudinal coordinates, and encoding a short message metadata of the short message including a coordinate field that records the longitudinal and latitudinal coordinates; and
  - a communications module, for transmitting the short message; and
- a guided mobile, which includes:
  - a communications module for receiving the short message;
  - a central processing unit (CPU) for accessing the short message to obtain the longitudinal and latitudinal coordinates from the coordinate field; and
  - a navigation application displaying a location point on a map of the navigation application according to the longitudinal and latitudinal coordinates obtained from the coordinate field when being wakened and launched through the received short message.

21. The navigating apparatus of claim 20, wherein the short message consists of (a) data of a text message, encoded in a state field, and (b) the metadata external to the text message, which includes the coordinate field and:
- a header field, filled with a code to indicate a format of the short message;
- a name field, filled with a name representing a user who sends the short message;
- a phone number field, recording the phone number of the user; and
- a checksum field, filled with a checksum code to detect a transmission error of the short message.

22. The navigating apparatus of claim 21, wherein the guided mobile further includes a memory module to store the longitudinal and latitudinal coordinates as a favorite location.

23. The navigating apparatus of claim 21, wherein the guided mobile further includes a display module to show the longitudinal and latitudinal coordinates.

24. The navigating apparatus of claim 20, wherein the navigation application of the guided mobile is wakened and launched by clicking the short message.

25. The navigating apparatus of claim 20, wherein the guiding mobile, responsive to a tracking short message from the guided mobile, transmits the short message containing the longitudinal and latitudinal coordinates.

26. The navigating apparatus of claim 20, wherein the coordinate field only records the longitudinal and latitudinal coordinates.

* * * * *